United States Patent Office 2,731,377
Patented Jan. 17, 1956

2,731,377

CEMENTITIOUS COMPOSITION AND PROCESS OF PRODUCING THE SAME

Wallace C. Riddell, Berkeley, and George B. Kirk, Redwood City, Calif., assignors, by mesne assignments, to Kaiser Gypsum Company, Inc., a corporation of Washington No Drawing. Application August 13, 1951,
Serial No. 241,698

5 Claims. (Cl. 154—88)

This invention relates to a light-weight gypsum composition and to a process for producing the same; and it further relates to a calcined gypsum slurry composition which, upon setting, forms a light-weight, cellular gypsum mass.

In order to provide lighter weight gypsum products, for example, wallboard, which are easier and less expensive to transport and to handle, requiring less labor and less freight costs, it has been customary to incorporate foam in the gypsum mass by various means. However, some of the foaming agents employed have had considerable affinity for water or moisture, thereby reducing the water-resistance of the final product. In many of the processes hitherto known for making cellular, light-weight gypsum products, a foam, e. g. of water and a foaming agent, has been separately prepared and then incorporated into the calcined gypsum slurry, but this necessarily incurs some loss of the foam in transfer to the slurry and some loss by breakdown as the foam is mixed into the slurry. Some of the foaming agents of the prior art react with the calcined gypsum, with resultant loss in foaming power, and with reduction in the cellular texture of the final product.

It is an object of this invention to provide an improved, lighter weight cementitious gypsum composition. It is a further object to provide a method of making a light weight, cellular gypsum composition whereby foam cells are directly produced within the calcined gypsum slurry. It is a still further object to produce within a calcined gypsum slurry a foam of increased stability and of increased volume per unit of foaming agent. Other objects will be apparent from the description below.

According to the present invention, a light-weight cellular gypsum mass is produced by incorporating in a calcined gypsum slurry from about 0.05% to about 1.0% by weight, based on the total dry weight, of a resin derived from wood, which is the petroleum-hydrocarbon-insoluble fraction of the coal-tar extract of pine wood, or of a water-soluble salt of such resin, and stirring the admixture to form a foam therein. (Both the resin and its salt can be added, if desired.) The slurry mass is then formed into the desired shape or shapes, dried and hardened. For instance, in making wallboard, the slurry mixture as described is agitated, deposited between fibrous liners, dried, hardened and cut to desired lengths. Preferably from 0.06% to 0.67% of the foaming agent is employed.

The foaming agent employed in this process and product is a resin which is derived from wood and which is a brittle solid at normal or room temperature and is thermoplastic; the resin is the petroleum hydrocarbon-insoluble fraction of the coal-tar extract of pine wood. A typical analysis of one such resin, which has been found useful in this invention, shows a softening point of about 116° C. (drop method), a saponification number of about 135, a methoxy content of about 5%, gasoline solubility of about 16%, and insolubility in petroleum ether to the extent of about 98%. This resin is available in commerce, from Hercules Powder Co., under the name Vinsol resin and is described in a booklet entitled "Vinsol," which is distributed by the aforesaid company. The exact chemical composition is not known.

The resin, as described, can be employed in finely divided form, as a water emulsion, or, preferably, it can be employed in the form of a water-soluble salt or soap. Such salts or soaps are suitably made by saponifying the resin with sodium hydroxide, potassium hydroxide, ammonium hydroxide, triethylamine, diethylamine, monoethylamine, sodium silicate, sodium carbonate, other alkaline agents, or mixtures of any of these. In other words, the water-soluble salt can be the resin salt of sodium or potassium or other alkali metals, or of ammonium, or the resin salt of a lower alkyl amine, preferably an amine having less than 6 carbon atoms in the alkyl group, which may be a primary, secondary or tertiary amine. The saponification reaction proceeds easily at room or slightly elevated temperatures. Where the resin is employed as a water emulsion, it is present in the emulsion in water in very finely divided particles, these particles averaging less than one micron in diameter.

The calcined gypsum is prepared in the manner well-known to the art, that is, by calcining raw gypsum to form calcium sulfate hemihydrate, $CaSO_4 \cdot \frac{1}{2} H_2O$, and the slurry is prepared by mixing calcined gypsum with water according to good commercial practice in this art. It is to be understood that the calcined gypsum slurry can contain, in addition to calcined gypsum and the foaming agent, other additives commonly employed in making gypsum products, for example, wallboard, including fibrous materials such as paper fiber, wood fiber or other natural or synthetic fibers, wood flour, binders such as starch, or other additives as desired. Especially advantageous results are obtained when lignin is employed in the slurry, with the foaming agent, as will be further described below.

It is an advantage of this invention that the process employed produces a substantially greater amount of foam per unit weight added in a gypsum slurry than previously known foaming agents. It is a further advantage that by the process of this invention there can be obtained a foam of much greater stability, thereby avoiding the necessity for adding excess foam to compensate for breakdown. It is still another advantage that the foam produced by the present process is in the form of small bubbles of substantially uniform size; and it is advantageous that the low-density gypsum product produced comprises a set mass of interlaced gypsum crystals having uniformly dispersed therein the small cells so produced, because such uniform, fine cellular structure results not only in light weight but in increased strength. That is to say, if, for example, nails or the like are to be driven through wallboard for installation thereof, the fine-celled structure enables much greater holding effect and power in contrast to a structure containing larger bubbles or cells.

The superior foaming capacity of saponified Vinsol resin and the improved stability of the foam produced are demonstrated by the following tests. These tests were carried out by methods as described in "Surface Chemistry for Industrial Research," J. J. Bikerman, published by Academic Press, 1947, at pages 90–101, and in "Laboratory Manual of Colloid Chemistry," by H. N. Holmes, published by John Wiley and Sons, 3rd edition, 1934, at page 87, "Dynamic Foam Meter." Two glass tubes, each 1⅛ inches inside diameter and 15 inches long, of approximately 210 cubic centimeters volume and tapered at one end, are each fitted with a porous membrane at the tapered end. In one is placed 25 cc. of a 5% solution of the sodium salt of the Vinsol resin and in the other, 25 cc. of a 5% solution of a sodium salt of wood rosin; and compressed air under a pressure of 3 inches Hg is bubbled through each solution, being introduced through the porous membrane. The foaming capacity is determined by noting the time required for foam to rise to the top of the glass tube. Foam stability is measured as the time required for complete collapse of the foam. Table I sets forth the results.

*Table I*

|  | Foaming Capacity, seconds | Foam Stability, seconds |
| --- | --- | --- |
| Saponified wood rosin | .70 | 90 |
| Saponified Vinsol resin | 55 | 150 |

This test shows the greatly increased foam stability of the saponified resin, as well as the improved foaming capacity.

Especially satisfactory results are obtained by admixing in the composition a small amount of a wetting agent, which can be, for example, Nacconol, sulfonated alkyl diphenyl, sulfonated alkyl toluene, etc.; or by admixing a small amount of lignin (waste sulfite liquor) or lignone sulfonate. There can advantageously be added in the slurry mixture, for example, from 0.01% to 0.3% of the wetting agent; or from 0.05% to 1.0% of waste sulfite liquor, on the dry basis; or, preferably, both components can be employed in these respective amounts. For example, where 0.2% of a wetting agent, such as a keryl benzene sulfonate (Nacconol), is admixed with a 5% potassium rosin soap solution in water and subjected to the foaming test described above with respect to Table I, a fine foam is formed, the foaming capacity being 13 minutes and foam stability, 2 minutes. In another test carried out in exactly the same way except that a 5% water emulsion of Vinsol resin is employed instead of the rosin soap solution, the foaming capacity is 10 minutes 25 seconds, and foam stability, 5 minutes 30 seconds. In still another such test wherein, instead of the wetting agent, 0.25% dried waste sulfite liquor is admixed with a 5% water solution of potassium rosin soap, the foaming capacity of this mixture is 19 minutes and foam stability, 3 minutes; whereas when a test is carried out with the dried sulfite liquor in exactly the same way except that a 5% water emulsion of Vinsol resin is employed (instead of the rosin soap solution), the foaming capacity is 15 minutes and the foam stability, over 60 minutes (a very strong foam). In other words, the stability of the Vinsol resin foam is very greatly increased by the addition of a small amount of waste sulfite liquor, and is considerably increased by the addition of a wetting agent.

The following example will more clearly illustrate the mode of carrying out the process of this invention, and the improved product obtained thereby.

Two runs are made, producing gypsum wallboard. In each, a slurry of calcined gypsum is prepared in the usual way, and with the addition of a small amount of paper fibers, sawdust, and corn flour. In run A, to approximately 3000 lbs. of the wet slurry mix is added a foaming agent which has been prepared by stirring together 50 lbs. of the resin hereinabove described (Vinsol resin), and 160 gallons of water in which 8 lbs. of NaOH have previously been dissolved (corresponding to about 0.5% of the sodium soap of Vinsol resin on the basis of total dry ingredients). The total mixture is then thoroughly mixed for about 45 seconds, whereupon a fine-textured foam is formed in the mass. The slurry is then deposited between fibrous liners in the known manner, in a conventional board-forming device, is dried, hardened and cut into lengths. Run B is carried out in exactly the same manner except that the foaming agent added is, instead of the saponified resin, a water solution containing 63 lbs. of potassium soap of wood rosin in 160 gallons of water. Table II shows the dry weight and the transverse flexural strength of the gypsum wallboard products so obtained.

*Table II*

|  | Run A | Run B |
| --- | --- | --- |
| Dry weight, in lbs. per 1,000 sq. ft.: |  |  |
| Maximum | 1,960 | 1,953 |
| Minimum | 1,863 | 1,875 |
| Average | 1,911 | 1,914 |
| Flexural strength, in lbs. per sq. in.: |  |  |
| Maximum | 160 | 165 |
| Minimum | 157 | 156 |
| Average | 162 | 161 |

The above results show that the same or somewhat improved weights and strengths are obtained with much less addition of the saponified resin as shown; and in other tests, similar improvement is observed when the potassium soap or salt of the Vinsol resin is employed. Good foams are also obtained when a water emulsion of this resin is employed, but the water-soluble salt is preferred. A suitable water-soluble salt or soap also can be prepared by any of the following examples. (1) To 50 gallons of water add 0.5 lb. triethylamine, and admix 100 lbs. of the Vinsol resin with stirring and agitation; then add 12 lbs. NaOH and stir thoroughly. (2) Admix 50 gallons of water, one lb. of a wetting agent, such as a keryl benzyl sulfonate, and one lb. of monoethylamine. Add to this mixture 100 lbs. of the resin, with thorough mixing, and then add 14 lbs. KOH and stir thoroughly. (3) To 50 gallons of water add 2 lbs. of a dispersing agent, such as lignin (waste sulfite liquor, dry basis), and admix 20 lbs. of sodium silicate therewith. Then add 100 lbs. of the resin, with mixing and then 5 lbs. of NaOH, and stir the whole thoroughly. In all of these saponifying examples (1, 2 and 3) the Vinsol resin described above is employed.

The resin employed herein provides an improved process and product as more fully discussed above. It has other advantages, however, in that the resin is obtainable as a dry powder, and can be shipped in sacks which are easily handled and emptied. This is in contrast to earlier known rosin soaps which are viscous liquids, requiring metal containers, which are sometimes not readily available and which, furthermore, entail considerable loss for the reason that not all of the liquid drains out of the drums or other containers, and being difficult to handle in other respects, requiring special apparatus therefor.

As previously stated, the Vinsol resin employed in this process is produced by the Hercules Powder Company and is a petroleum ether-insoluble extracted resin from pine wood, the chemical composition of the resin not being known, but it contains oxidized resin acids and other oxidized resin constituents, and is low in abietic acid. Some typical characteristics of Vinsol resin currently available are set forth above. Another such resin, useful in this invention, is produced by Crosby Chemicals, Inc., and is known as Corex, currently available as having the following typical analysis: Acid number, 95; softening point, 245° F. (118° C.) (drop method) or 108° C. (ring and ball method); saponification number 120; unsaponifiable, 11%; gasoline soluble, 20%; toluene soluble, 10%; color, black; ash, 1.0%. Corex is a dark colored high melting wood resin. The composition or chemical constitution of the water-soluble salts of these resins is likewise not known but the salts, as stated, are prepared in a simple manner by reaction in the cold to substantial neutrality.

Whereas the process has been specifically described above as applied in the manufacture of wallboard, it is also applicable in making other gypsum products of lighter weight. The low-density product is essentially a set mass of interlaced gypsum crystals of substantially uniformly dispersed voids, and containing the foaming agent in the amount set forth above. In the specification and claims percentages are by weight unless otherwise indicated.

It is to be understood that the above specific description and examples are given for purposes of illustration only, and variations and modifications can be made therein without departing from the spirit and scope of the appended claims.

Having now described the invention, what is claimed is:

1. Process for making a low-density cellular gypsum wallboard which comprises preparing a water slurry containing calcined gypsum and from 0.05% to 1.0%, based on the total dry weight, of at least one substance chosen from the group consisting of the petroleum hydrocarbon-insoluble fraction of the coal-tar extract of pine wood and a water-soluble salt of said fraction, thoroughly mixing said slurry mixture to form fine textured foam therein, depositing said foam-containing slurry between fibrous liners, drying and hardening.

2. Process as in claim 1 wherein there is added from 0.06% to 0.67% of said chosen substance.

3. Process as in claim 1 wherein said chosen substance is an alkali metal salt of said resin.

4. Process as in claim 1 wherein there is admixed from 0.05 to 1.0% of waste sulfite liquor, calculated on the dry basis.

5. A lightweight gypsum wallboard having a core consisting essentially of a set mass of interlaced gypsum crystals of fine cellular structure and containing from 0.05% to 1.0% of at least one substance chosen from the group consisting of the petroleum hydrocarbon-insoluble fraction of the coal-tar extract of pine wood and a water-soluble salt of said fraction.

References Cited in the file of this patent

UNITED STATES PATENTS

| Number | Name | Date |
|---|---|---|
| 1,936,887 | Spencer | Nov. 28, 1933 |
| 2,172,076 | Wolf et al. | Sept. 5, 1939 |
| 2,225,150 | Bechtold et al. | Dec. 17, 1940 |
| 2,288,736 | Osserman | July 7, 1942 |
| 2,354,156 | Sucetti | July 18, 1944 |
| 2,355,966 | Goff | Aug. 15, 1944 |
| 2,382,561 | Gregory | Aug. 14, 1945 |
| 2,451,446 | Parsons | Oct. 12, 1948 |
| 2,463,927 | Watts | Mar. 8, 1949 |
| 2,478,831 | MacPherson | Aug. 9, 1949 |
| 2,483,806 | Buckley et al. | Oct. 4, 1949 |
| 2,521,073 | Ludwig | Sept. 5, 1950 |
| 2,529,835 | Dailey et al. | Nov. 14, 1950 |
| 2,542,364 | Schenker et al. | Feb. 20, 1951 |
| 2,593,008 | Chappel | Apr. 15, 1952 |